United States Patent [19]
Austin

[11] 3,737,728
[45] June 5, 1973

[54] MOUNTING STRUCTURE FOR HEAT-GENERATING DEVICES

[75] Inventor: James E. D. Austin, Southbridge, Mass.

[73] Assignee: Data General Corporation, Southboro, Mass.

[22] Filed: Dec. 17, 1971

[21] Appl. No.: 209,316

[52] U.S. Cl. ...........317/100, 317/101 F, 174/DIG. 5
[51] Int. Cl. ...............................................H05k 7/20
[58] Field of Search .......................174/DIG. 5, 15 R, 174/16 R; 317/100, 101 F

[56] References Cited

UNITED STATES PATENTS

| | | | |
|---|---|---|---|
| 3,193,707 | 7/1965 | Yanai | 174/DIG. 5 |
| 3,616,533 | 11/1971 | Heap | 317/100 |
| 3,519,889 | 7/1970 | Monaco | 317/100 |
| 3,325,582 | 6/1967 | Ehrmann | 174/15 R |
| 3,417,300 | 12/1968 | Kauffman | 174/15 R |
| 3,665,256 | 5/1972 | Gown | 174/15 R |
| 3,611,046 | 10/1971 | Covert | 317/100 |

FOREIGN PATENTS OR APPLICATIONS

| | | | |
|---|---|---|---|
| 659,585 | 1/1957 | Canada | 174/DIG. 5 |

*Primary Examiner*—Robert K. Schaefer
*Assistant Examiner*—Gerald P. Tolin
*Attorney*—Robert F. O'Connell, Sewall P. Bronstein, John D. Woodberry et al.

[57] ABSTRACT

A structure for mounting a large number of closely spaced heat-generating devices of a relatively fragile nature, such as magnetic core memories for use in computer apparatus. The devices are affixed to a flexible heat conducting sheet having a pair of tabs projecting from opposite edges thereof. A relatively rigid metallic cover having corresponding tabs is attached to the heat conducting sheet at the tabs. The tabs on the cover are formed so as to project downwardly from the general plane of the cover so that when they are attached to the tabs of the heat conducting sheet a space is provided between the cover and the sheet in which the devices are positioned. A plurality of resilient members are placed at various points within such space and air is caused to flow in a non-turbulent fashion past the overall structure and, particularly, through the space between the cover and heat conducting sheet. Such a structure using a material having high heat conductivity provides for uniformity of heat distribution in the core assembly and good heat dissipation therefrom.

5 Claims, 5 Drawing Figures

MOUNTING STRUCTURE FOR HEAT-GENERATING DEVICES

DISCLOSURE OF THE INVENTION

This invention relates generally to mounting structures and, more particularly, to means for mounting relatively fragile, heat-generating devices on a flexible heat conducting sheet so as to provide for relatively good heat dissipation from such devices while simultaneously providing effective mechanical protection for such devices.

In mounting a relatively large number of heat-generating devices in an apparatus, such as in mounting magnetic core memory devices in a computer apparatus, particularly where such devices are relatively closely spaced, a relatively large amount of heat, often localized at different regions of the core assembly, is generated so that the distribution of heat within the core assembly tends to be non-uniform. The overall heat generated also must be effectively dissipated so that the cores themselves, as well as other devices in the general vicinity thereof, will not be adversely affected by the presence of excessive heat. Moreover, such devices are often of a relatively fragile nature and it is further desirable to prevent damage thereto since the sheet on which they are mounted is relatively flexible and may be subject to some flexure during handling and use.

In previously known structures wherein heat-generating devices, such as magnetic core memories, are placed within a specified area on a relatively flexible sheet member which often has relatively low heat conductivity characteristics, the heat generated thereby is normally dissipated through the air, the devices being left effectively uncovered on the sheet member. In such structures the heat dissipation is often not sufficient to prevent adverse operation of the devices themselves or of other elements or devices in the general vicinity due to thermal disturbances thereof. Moreover, if the sheet on which they are mounted is flexed excessively, the cores become subject to undesirable stresses which may cause them to become damaged because of their relatively fragile construction.

This invention provides a structure wherein the heat generated within a region is made relatively uniform over such region and wherein the overall heat dissipation characteristics are improved over previously known mounting structures. Further, the invention provides sufficient mechanical support to prevent damage to the heat-generating devices due to excessive flexure of the sheet on which they are mounted.

In the invention, a flexible, heat conductive sheet on which heat-generating devices are mounted is provided with a pair of tabs extending from opposite edges thereof. A relatively rigid cover means having a general configuration the same as that of the sheet on which the heat-generating devices are mounted also has a pair of corresponding tabs extending from opposite edges thereof, such tabs further extending downwardly from the general plane of the cover so that, when they are affixed to the corresponding tabs of the heat conductive sheet, a space is provided between the sheet and the cover means. A plurality of resilient members are mounted between the cover and the sheet at selected positions about the edges thereof. The sheet and the cover are each made of a material having relatively high heat conductivity, the tabs thereof mechanically connected so as to provide good thermal contact therebetween.

The use of a heat conductive sheet distributes the heat generated by the devices in a uniform manner over the region wherein the devices are mounted and also conducts heat to the cover via the tabs, where the heat is then carried away by a flow of air which is directed across and through the overall mounting structure. Moreover, the use of a relatively rigid cover provides a mechanical protection and rigidity to the overall structure so that the flexible sheet cannot be unduly flexed, the devices mounted thereon being thereby adequately supported mechanically so as to prevent damage thereto.

A detailed description of the structure of the invention can be described with reference to the accompanying drawing wherein.

Figures 1, 2, 3:
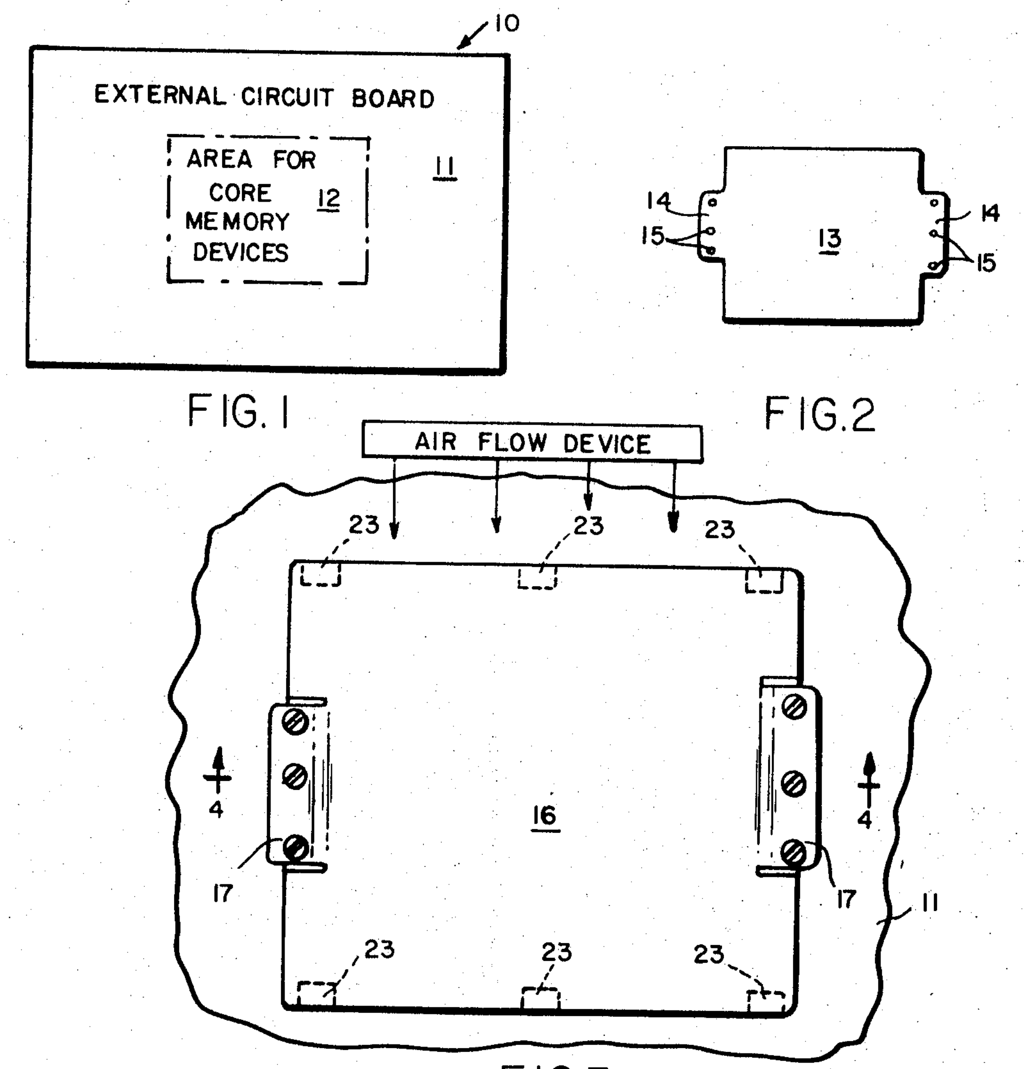
FIG. 1 shows a plan view of an environment in which the mounting structure of the invention can be used.
FIG. 2 shows a plan view of a heat conducting sheet of the invention on which heat-generating devices are affixed.
FIG. 3 shows an enlarged plan view of the structure of the invention showing the cover member affixed to the heat conducting sheet of FIG. 2.

FIG. 1 shows a simplified plan view of an overall modular unit 10 for use in a computer apparatus, for example, which unit includes magnetic core memory devices and appropriate circuitry for use in the operation of the computer. Unit 10 may be in the form of a circuit board 11, fabricated from an appropriate epoxy plastic material, for example, on which are formed printed circuits of appropriate design for the particular apparatus in which the unit is used. Since a knowledge of the particular circuitry which may be used thereon is not necessary for a description of the invention, no specific circuits are shown in detail, it being understood that the area 11 of the overall unit 10 represents the circuit board portion of such unit. The central area 12 of unit 10 has mounted thereon a plurality of heat-generating devices, such as magnetic core memory devices, the particular structure and operation of which in a computer is well known to those in the art and need not be described in detail.

In a typical unit such cores are mounted in the area 12 of unit 10 on a relatively flexible sheet of material which is in turn appropriately attached to circuit board 11 with the memory cores thereon being left exposed to the surrounding atmosphere. Since the circuit board 11 and the sheet are both made of relatively flexible materials, the board is often subject to flexure in handling and installation and, if the flexure is sufficiently severe, the relatively fragile magnetic core devices are in turn subject to possible mechanical damage. Moreover, if the cores are merely left exposed to the surrounding atmosphere, the heat generated is not uniformly distributed over the area 12 and may not be sufficiently dissipated therefrom to avoid undesirable thermal effects on the operation or structure of the devices themselves or possibly on the surrounding circuitry.

Figure 4:
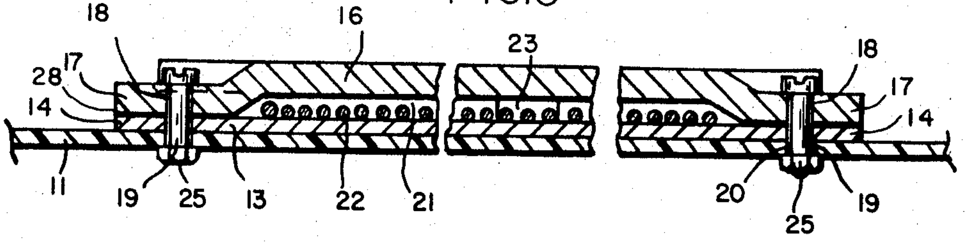
FIG. 4 is a further enlarged view in cross-section of the structure of the invention taken along the lines 4—4 of FIG. 3.

In order to overcome the thermal and mechanical problems arising from a typical construction as shown in FIG. 1, the configuration of FIGS. 2–4 is used in accordance with this invention.

FIG. 3 depicts a plan view of a heat conducting sheet 13 to which the heat-generating devices are affixed. Such a sheet may contain several hundred, or more, of such devices in an area as small as 30 sq. in. As can be seen, the sheet is of a generally rectangular configuration and has a pair of tab members 14 extending from opposite edges thereof, as shown. Sheet 13 may be made of a material having relatively high conductive characteristics, such as aluminum, and is relatively thin and thereby flexible, in a preferred embodiment being about 0.025 inches in thickness. Tab members 14 thereof each have a plurality of holes 15 which correspond to holes in a circuit board 11 of the type discussed in connection with FIG. 1 and partially shown in FIGS. 3 and 4. Thus, sheet 13 can be appropriately affixed to circuit board 11 as discussed below.

FIGS. 3 and 4 depict two views of the mounting structure of the invention using heat conducting sheet 13 and a cover member 16 which has the same general rectangular configuration as sheet 13. A pair of tab members 17 are formed in cover 16 and extend downwardly at an angle from the general plane thereof, as shown best in FIG. 4. Tab members 17 correspond to tab members 14 and also have a plurality of holes 18 corresponding to holes 15 of the latter tabs. As can be seen in FIG. 4, appropriately threaded screws 19 are used to affix sheet 13 and cover 16 to circuit boad 11 via holes 20 of circuit board 11 and nuts 25 so that said tab members 14 are retained in effectively full thermal contact with tab members 17. To enhance the conduction of heat from tab member 14 to tab member 17, a heat conducting grease 28, such as a silicon grease, can be placed between tab members 14 and 17, as shown.

Since tab members 17 of cover 16 are arranged to extend downwardly from the general plane of the cover, a space 21 is provided between the cover and the sheet on which heat-generating devices 22 are affixed. The tab members 17 are arranged to extend downwardly by a preselected amount so as to prevent the heat-generating devices 22 from touching the underside of cover 16 and to provide the most effective flow of air therethrough for cooling purposes.

A plurality of resilient members 23 made, for example, of a resilient foam plastic, or other similar material, such as rubber, are disposed in space 21 at various positions, preferably near the corresponding edges of cover 16 and sheet 13 to assist in maintaining a substantially uniform space 21 therebetween. For example, three of such resilient members can be placed along one edge of the assembly and three others are placed along the opposite edge thereof, as shown in FIG. 3.

Figure 4A:
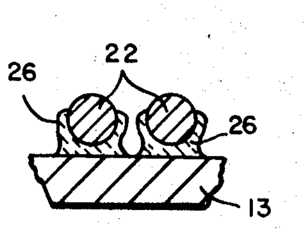
FIG. 4A is a further enlarged view in cross-section of a portion of the structure of FIG. 4 showing the heat generating devices as adhered to the heat conducting sheet.

As shown in FIG. 4A, heat-generating devices 22 are affixed to sheet 13 through the use of an appropriate adhesive material 26 which has relatively good heat conductivity, such as Silastic, a plastic adhesive made by General Electric Company. The adhesive material is arranged to contact a relatively large portion of each heat-generating device, as shown, so that not only are they mechanically affixed to sheet 13 in an adequate manner but good heat conductivity is achieved from a relatively large surface area of the device 22 to a relatively large surface area of the sheet 13. A suitable air flow device 27, such as a fan, is mounted in an appropriate manner adjacent the overall assembly so that cooling air can be passed around the assembly and through the space 21 between cover 16 and sheet 13.

The use of a high heat conductive sheet 13 provides a generally uniform distribution of heat throughout substantially the entire area where the heat-generating devices are located. Moreover, the heat which is so generated is conducted through sheet 13 to tab members 14 and 17 which, as mentioned above, are maintained in good thermal contact, and thence to the main area of cover 16. Additional heat may be conveyed to the underside of the cover directly from the heat-generating devices 22. The air flowing past cover 16, both above it and through space 21, carries away the heat therefrom so that the overall heat that is generated is very effectively reduced. In order to further enhance the heat dissipation of the overall structure, the spatial distance from sheet 13 to cover 16 is set at a value such that substantially non-turbulent air flow exists in space 21. The use of a non-turbulent flow increases the efficiency of heat dissipation over that provided by a turbulent flow therethrough. A spacing of 0.125 inches for the above specified dimensions of sheet 13 and cover 16 has been found to provide acceptable flow characteristics.

In such a structure, circuit board 11 and sheet 13 are of a relatively flexible nature, while cover member 16 is of a relatively rigid nature, the latter also being made of aluminum having relatively high heat conductivity and having a thickness, for example, of about 0.125 inches. Thus, in accordance with the construction of the invention, the cover 16 provides sufficient rigidity to the overall structure so that, while a certain amount of flexure of sheet 13 is permitted, the presence of the cover and the resilient members 23 does not permit enough flexure to cause damage to the heat-generating devices 22 affixed thereto.

What is claimed is:

1. Means mounting a plurality of heat-generating devices comprising:

a flexible heat conductive sheet, said devices being affixed thereto and said sheet having at least one tab member extending beyond an edge thereof;

a rigid cover means with open sides having at least one tab member extending downwardly from the plane of said cover means and having a configuration substantially corresponding to that of said tab member of said flexible sheet, a portion of said tab member extending beyond an edge of said cover means;

means retaining said tab member of said flexible sheet in good thermal contact with said tab member of said cover means, thereby providing a substantially open space between said cover means and said flexible sheet; and a plurality of resilient members disposed in said space spacing said cover from said sheet.

2. A mounting means in accordance with claim 1 wherein:

said flexible sheet has two tab members extending beyond opposite edges of said sheet; and said cover means has two tab members extending beyond opposite edges of said cover means and having configurations corresponding to said two tab members of said flexible sheet.

3. Mounting means in accordance with claim 2 and further including means providing a flow of cooling air past said cover means and through said open space.

4. A mounting means in accordance with claim 3 wherein the tab members of said cover means extend downwardly by a preselected distance to provide said open space between said flexible sheet and the plane of said cover means whereby said cooling air flows substantially without turbulence through said open space and the heat-generating devices affixed to said sheet are prevented from touching said cover means.

5. A mounting means in accordance with claim 4 wherein each of said heat-generating devices is affixed to said flexible sheet by a heat conducting adhesive which contacts a substantial portion of the surface of each of said devices.

* * * * *